US007630990B2

(12) United States Patent
Hirata (10) Patent No.: US 7,630,990 B2
(45) Date of Patent: Dec. 8, 2009

(54) ENDMEMBER SPECTRUM DATABASE CONSTRUCTION METHOD, ENDMEMBER SPECTRUM DATABASE CONSTRUCTION APPARATUS AND ENDMEMBER SPECTRUM DATABASE CONSTRUCTION PROGRAM

(75) Inventor: Hiromichi Hirata, Tokyo (JP)

(73) Assignee: NEC Corporation (JP)

( * ) Notice: Subject to any disclaimer, the term of this patent is extended or adjusted under 35 U.S.C. 154(b) by 527 days.

(21) Appl. No.: 11/168,338

(22) Filed: Jun. 29, 2005

(65) Prior Publication Data

US 2005/0286770 A1 Dec. 29, 2005

(30) Foreign Application Priority Data

Jun. 29, 2004 (JP) ............... 2004-191437

(51) Int. Cl.
*G06F 17/00* (2006.01)
*G06K 9/46* (2006.01)
(52) U.S. Cl. ................ 707/100; 707/6; 308/191
(58) Field of Classification Search ............ 707/6, 707/100; 382/191
See application file for complete search history.

(56) References Cited

U.S. PATENT DOCUMENTS

| 6,772,151 B1 * | 8/2004 | Johnston et al. ............ 707/6 |
| 6,804,400 B1 * | 10/2004 | Sharp ................. 382/239 |
| 2003/0161533 A1 * | 8/2003 | Sunshine et al. ........ 382/191 |
| 2004/0213459 A1 * | 10/2004 | Ishimaru et al. ......... 382/191 |

OTHER PUBLICATIONS

"ENVI Tutorial"; Research Systems Inc.; Sep. 2003; p. 373.
"ENVI Tutorial"; Research Systems Inc.; Sep. 2003: pp. 329-330.
"ENVI Tutorial"; Research Systems Inc.; Sep. 2003; pp. 340-341.
Yoshio Yamaguchi, et al.; "Information extraction from earth observation data"; Earth Remote Sensing Data Analysis Center (ERSDAC); 2003; pp. 118-122.

* cited by examiner

*Primary Examiner*—Etienne P LeRoux
*Assistant Examiner*—Cindy Nguyen
(74) *Attorney, Agent, or Firm*—Dickstein, Shapiro, LLP.

(57) ABSTRACT

According to one embodiment, an endmember spectrum extraction unit generates an input endmember spectrum group from a hyperspectral image. A collation unit outputs an endmember spectrum group including endmember spectra that are registered with neither a spectrum library nor an endmember spectrum database as a new endmember spectrum group. An input endmember spectrum distribution image generation unit generates an input endmember distribution image every input endmember spectrum. A new endmember spectrum distribution image selection unit selects an input endmember spectrum distribution image that is included in input endmember spectrum distribution images and that corresponds to new endmember spectrum as a new endmember distribution image. The user recognizes what kind of object corresponds to each new endmember spectrum on the basis of the new endmember spectrum distribution image, the hyperspectral image and a high resolution image, and determines and orders whether to register each new endmember spectrum with the endmember spectrum database.

21 Claims, 9 Drawing Sheets

FIG.9

ENDMEMBER SPECTRUM DATABASE CONSTRUCTION METHOD, ENDMEMBER SPECTRUM DATABASE CONSTRUCTION APPARATUS AND ENDMEMBER SPECTRUM DATABASE CONSTRUCTION PROGRAM

BACKGROUND OF THE INVENTION

1. Field of the Invention

The present invention relates to an endmember spectrum database construction method, an endmember spectrum database construction apparatus and an endmember spectrum database construction program product used to construct an endmember spectrum database which stores endmember spectra of objects each including a plurality of substances.

2. Description of the Related Art

In recent years, a technique called hyperspectral imaging is appearing. Hereafter, such a technique will be described briefly.

A camera for hyperspectral imaging is mounted on an airplane or an earth satellite, and the image on the ground is picked up by this camera from the sky. A spectrum apparatus disposed behind a lens of this camera separates light having visible light wavelengths, near infrared ray wavelengths and far infrared ray wavelengths (for example, 300 nm to 2,000 nm) into spectral components every predetermined wavelength width. Each of a plurality of image pickup elements disposed in the camera outputs an image of each wavelength. In this way, an image can be obtained every pixel every wavelength. Such an image is a hyperspectral image.

If the image of each pixel and each wavelength is an image with light being separated into N (for example, 200) wavelength components, an N-dimensional vector including N wavelength components can be formed. Therefore, each pixel can be associated with an N-dimensional vector at that pixel.

If each pixel contains only light reflected by a single substance, a spectrum of that pixel coincides with a spectrum of the single substance. Such a spectrum of the single substance can be obtained in a laboratory and stored in a spectrum library.

However, spatial resolution of the image picked up from the sky is not so high, and the spectrum of each pixel becomes a mixture of spectra of a plurality of substances. In many cases, therefore, it is meaningless to analyze a hyperspectral image obtained from an image picked up from the sky and attempt to know a substance that has produced a pixel as a result of image pickup every pixel, except when the same substance is distributed over a wide area.

On the other hand, it is considered that a spectrum of a pixel obtained by picking up an image of a ship of a certain kind and a spectrum of a pixel obtained by picking up another ship of the same kind are common in at least a part, because there is a common substance between the ships of that kind. In the same way, it is considered that a spectrum of a pixel obtained by picking up an image of an automobile of a certain kind and a spectrum of a pixel obtained by picking up another automobile of the same kind are common in at least a part. It is also considered that a spectrum of a pixel obtained by picking up an image of a railway vehicle of a certain kind and a spectrum of a pixel obtained by picking up another railway vehicle of the same kind are common in at least a part. It is also considered that a spectrum of a pixel obtained by picking up an image of a railway vehicle of a certain kind and a spectrum of a pixel obtained by picking up another railway vehicle of the same kind are common in at least a part. It is also considered that a spectrum of a pixel obtained by picking up an image of a house of a certain kind and a spectrum of a pixel obtained by picking up another house of the same kind are common in at least a part.

If objects each including a plurality of substances are associated respectively with spectra, therefore, it is considered that the object can be guessed from its spectrum. Therefore, it is considered that it becomes possible to know which substance is distributed in what manner by picking up an image on the ground from the sky and obtaining a hyperspectral image.

Each pixel includes not only an object but also the ground serving as the background. Therefore, spectra of each pixel do not perfectly coincide with spectra of only the object. If an endmember spectrum is found from the whole image, however, it is considered that it becomes possible to associate the endmember spectrum with the object. If an N-dimensional vector obtained by dividing a spectrum of each of pixels forming an image into N bands and making the magnitude of each dimension equal to the level of each band can be expressed as a linear combination of M N-dimensional vectors with respect to pixels of a great part of the image (especially pixels crowding like a cloud in the N-dimensional space), each of the M N-dimensional vectors is referred to as endmember spectrum. Typically, a plurality of endmember spectra are distributed at ends of a region where vector tips crowd like a cloud.

SUMMARY OF THE INVENTION

Therefore, an object of the present invention is to provide an endmember spectrum database construction method, an endmember spectrum database construction apparatus and an endmember spectrum database construction program product used to construct an endmember spectrum database which stores endmember spectra of an object including a plurality of substances.

According to the present invention, there is provided a method for constructing an endmember spectrum database which stores endmember spectra of objects each formed of a plurality of substances, said method comprising the steps of: obtaining a plurality of input endmember spectra from an input hyperspectral image; calculating a similarity between each input endmember spectrum included in the input endmember spectra and a spectrum of each substance stored in a spectrum library which stores spectra respectively of substances; calculating a similarity between each input endmember spectrum included in the input endmember spectra and each registered endmember spectrum already stored in the endmember spectrum database; and registering an input endmember spectrum that is included in the input endmember spectra and that is less than a predetermined value in all similarities, with the endmember spectrum database.

In the method, each of the similarities may be a weighted average of similarities calculated by a plurality of similarity calculation methods.

The method may further comprise the steps of: inputting an object name corresponding to the input endmember spectrum registered, from outside; and registering the object name with the endmember spectrum database so that the object name is associated with the input endmember spectrum registered.

The method may further comprise the step of: inputting from outside whether to permit to register an input endmember spectrum that is included in the input endmember spectra and that is less than a predetermined value in all similarities, with the endmember spectrum database, wherein at the registering step, an input endmember spectrum that is included in the input endmember spectra, that is less than a predetermined value in all similarities, and that is permitted to be registered, may be registered with the endmember spectrum database.

The method may further comprise the steps of: generating a plurality of input endmember spectrum distribution images respectively corresponding to the plurality of the input endmember spectra, on the basis of the hyperspectral image and the plurality of input endmember spectra; and displaying the hyperspectral image and the input endmember spectrum distribution image every input endmember spectrum.

The method may further comprise the step of displaying a high resolution image which has the same scope as the hyperspectral image and which is higher in resolution than the hyperspectral image.

The method may further comprise the step of obtaining the hyperspectral image and the high resolution image of the same subject at the same time by picking up images of the same subject simultaneously.

According to the present invention, an endmember spectrum that is not registered previously with a spectrum library and that is not registered previously with an endmember spectrum database is newly registered with the endmember spectrum database. As the endmember spectrum database grows, therefore, it widely represents objects which are present on the earth. It becomes possible to identify an object which is present on a specific position on the earth with high accuracy. Furthermore, it becomes possible to know which kind of object is distributed in what manner on the earth with high accuracy.

DESCRIPTION OF THE EMBODIMENTS

Hereafter, embodiments of the present invention will be described in detail with reference to the drawings.

First Embodiment

Figure 1:
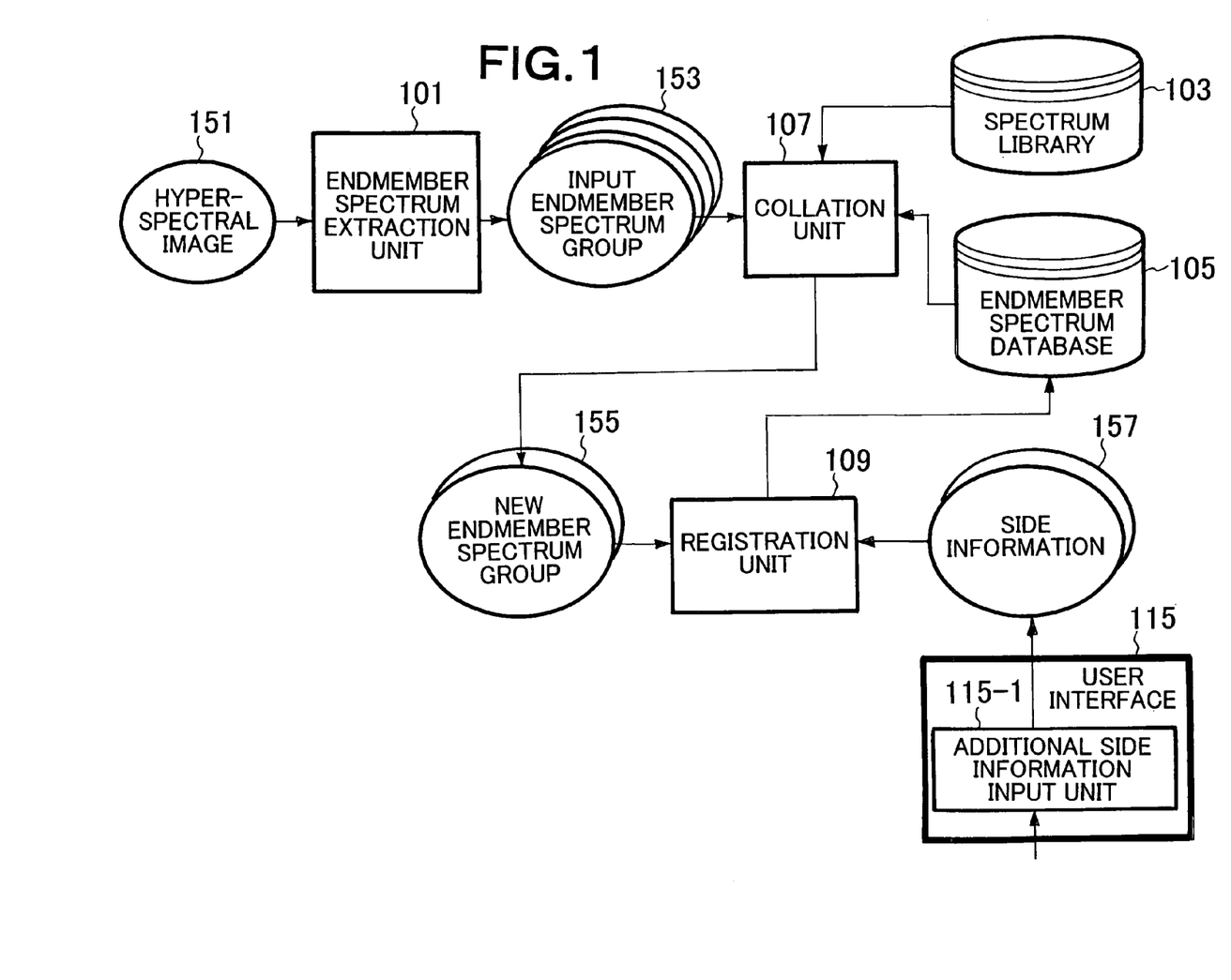
FIG. 1 is a block diagram showing a configuration of an endmember spectrum construction apparatus according to a first embodiment of the present invention.

FIG. 1 is a block diagram showing a configuration of an endmember spectrum database construction apparatus according to the first embodiment of the present invention.

With reference to FIG. 1, the endmember spectrum database construction apparatus according to the present embodiment includes an endmember spectrum extraction unit 101, a spectrum library 103, an endmember spectrum database 105, a collation unit 107, a registration unit 109 and an additional side information input unit 115-1. The additional side information input unit 115-1 is included in a user interface 115. Although the endmember spectrum extraction unit 101, the collation unit 107, the registration unit 109 and the additional side information input unit 115-1 can be formed of hardware, they can also be implemented by a computer which reads from a computer-readable medium a program for causing the computer to function as these components and executes the program.

Figure 2:
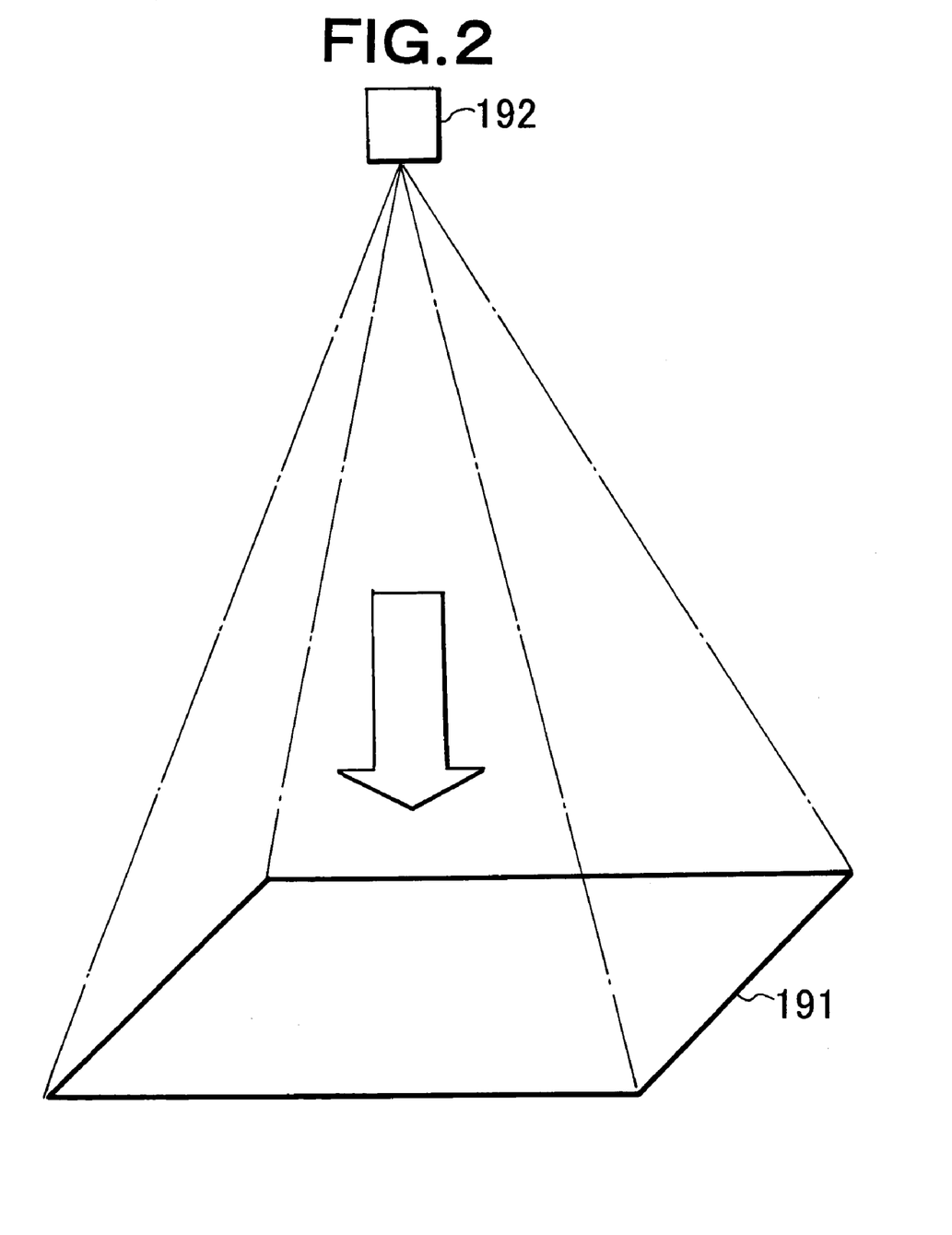
FIG. 2 is a diagram showing a hyperspectral image pickup method according to the first embodiment of the present invention.

A hyperspectral image 151 is obtained by picking up an image of a region 191 from the sky with a camera 192 for hyperspectral image as shown in FIG. 2.

The endmember spectrum extraction unit 101 extracts a plurality of endmember spectra from the hyperspectral image 151, and outputs them as an input endmember spectrum group 153. As a method for endmember spectrum extraction, for example, the PPI (Pixel Purity Index) method can be used. The PPI method is a method for searching a pixel having a high purity or an extreme pixel. The PPI method is described in, for example, "ENVI tutorial" published by Research Systems Inc. in September 2003, p. 373, and it is a technique for public use.

The spectrum library 103 stores spectra of a plurality of pure substances.

The endmember spectrum database 105 stores endmember spectra which are spectra of an object including a plurality of substances, every object. In the initial state, the endmember spectrum database 105 is empty.

The collation unit 107 calculates a similarity between each of input endmember spectra contained in the input endmember spectrum group 153 and each of spectra contained in the spectrum library 103, and a similarity between each of input endmember spectra contained in the input endmember spectrum group 153 and each of spectra contained in the endmember spectrum database 105. The collation unit 107 outputs the input endmember spectra which satisfy a condition that all the similarities thereof are less than a predetermined value as a new endmember spectrum group 155. The similarity will be described later.

The registration unit 109 registers all new endmember spectra contained in the new endmember spectrum group 155 with the endmember spectrum database 105 together with the side information 157. Here, the side information 157 includes the acquisition date and time of the hyperspectral image, an area where the hyperspectral image has been picked up, a file name of the hyperspectral image 151, pickup conditions (such as altitude and weather condition) of the hyperspectral image, a algorithm name of endmember spectrum extraction, and an object name corresponding to the new endmember spectrum.

The additional side information input unit 115-1 inputs additional side information given by the user. The additional side information is, for example, an object name corresponding to new endmember spectrum which is difficult for the apparatus to identify.

Figure 3:
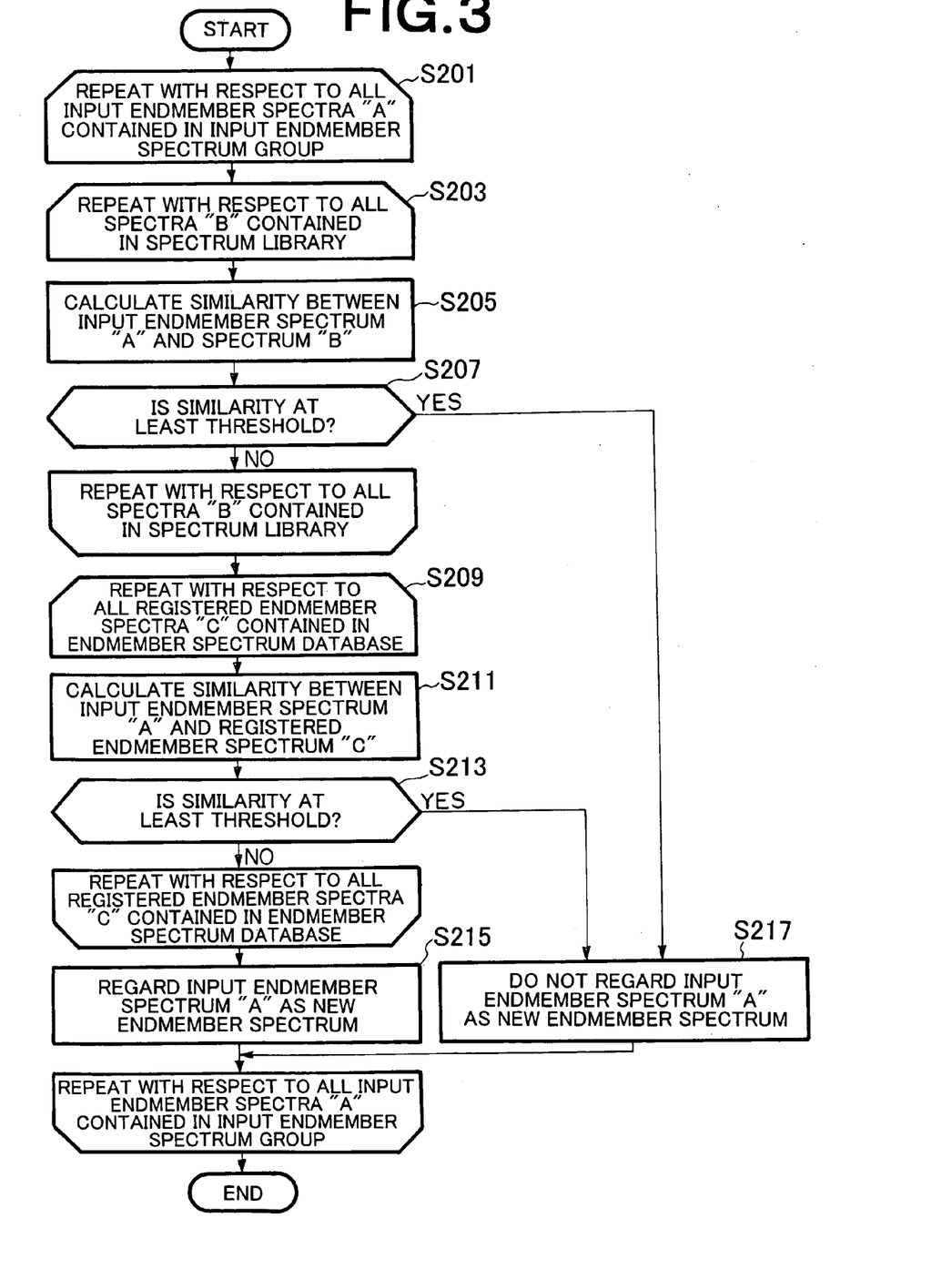
FIG. 3 is a flow chart showing operation of a collation unit shown in FIG. 1.

Operation of the collation unit 107 will now be described with reference to FIG. 3.

First, steps S203 to S217 are repeated with respect to all input endmember spectra (hereafter referred to as "input endmember spectrum A") contained in the input endmember spectrum group 153.

At step S203, steps S205 and S207 are repeated with respect to all spectra (hereafter referred to as "spectrum B") in the spectrum library 103.

At step S205, a similarity between the input endmember spectrum A and the spectrum B is calculated. As the similarity, a weighted average of a similarity calculated using the SAM (Spectral Angle Mapper) method and a similarity calculated using the SFF (Spectral Feature Fitting) method can be adopted. The SAM method is a method for calculating an angle between two spectra. The SAM method is described in, for example, "ENVI tutorial" published by Research Systems Inc. in September 2003, pp. 329-330, and it is a technique for public use. The SFF method is a method for calculating a similarity in absorption characteristic between two spectra. The SFF method is described in, for example, "ENVI tutorial" published by Research Systems Inc. in September 2003, pp. 340-341, and it is a technique for public use. Denoting a normalized similarity according to the SAM method by x and a normalized similarity according to the SFF method by y, a weighted average z of them can be expressed as $z=(ax+by)/(a+b)$ by using two real numbers a and b. The two real number values "a" and "b" can be adjusted by the user. They should be contained in the side information 157.

At step S207, it is determined whether the similarity calculated at the step S205 is the same as or greater than a threshold. The threshold can also be adjusted by the user, and it should also be contained in the side information 157.

If the similarity calculated at the step S205 is the same as or greater than the threshold (YES at the step S207), the input endmember spectrum A is not handled as the new endmember spectrum (step S217). If the similarity calculated at the step S205 is lee than the threshold, repetition at the step S203 is continued.

Subsequently, at step 209, steps S211 and S213 are repeated with respect to all registered endmember spectra (hereafter referred to as "registered endmember spectrum C") in the endmember spectrum database 105.

At step s211, a similarity between the input endmember spectrum A and the registered endmember spectrum C is calculated by using a method similar to that used at the step S205.

At the step S213, it is determined whether the similarity calculated at the step S211 is the same as or greater than the threshold. The threshold can also be adjusted by the user, and it should also be contained in the side information 157.

If the similarity calculated at the step S211 is the same as or greater than the threshold (YES at the step S213), the input endmember spectrum A is not handled as the new endmember spectrum (step S217). If the similarity calculated at the step S211 is less than the threshold, repetition at the step S209 is continued.

If the processing does not proceed to the step S217 from the step S207 or S213 during the repetition at the step S203 or the repetition at the step S209, the processing arrives at step S215, where the current input endmember spectrum A is handled as the new endmember spectrum.

Second Embodiment

In the first embodiment, all endmember spectra judged to be new endmember spectra by the collation unit 107 are registered with the endmember spectrum database 105 unconditionally. However, an endmember spectrum is not always a new endmember spectrum of a new object, even when the endmember spectrum is judged to be a new endmember spectrum by the collation unit 107. In particular, the endmember spectrum database 105 is used to associate endmember spectra respectively with object names and to obtain an object name from a spectrum later. Therefore, adding endmember spectra to the endmember spectrum database 105 without attaching an object name is meaningless. Therefore, it is desirable to make the user recognize an object which is represented by an endmember spectrum judged to be a new endmember spectrum by the collation unit 107 and make the user determine whether to register the endmember spectrum.

Furthermore, it is conceivable to raise the threshold at the steps S207 and S213 and thereby decrease the probability of occurrence of an error that an endmember spectrum of a new object is not registered with the endmember spectrum database 105. Doing so increases the probability of occurrence of an error that an endmember spectrum that is not an endmember spectrum of a new object is registered with the endmember spectrum database 105. Therefore, it is conceivable to decrease the probability of occurrence of the former cited error by raising the threshold, and decrease the probability of occurrence of the latter cited error by making the user recognize an object which is represented by an endmember spectrum judged to be a new endmember spectrum by the collation unit 107 and making the user determine whether to register the endmember spectrum.

In addition, the new endmember spectrum is caused by waves on the sea surface, geography, the clouds or the like in some cases. Therefore, it is suitable not to register the new endmember spectrum caused by such causes with the endmember spectrum database 105.

In the second embodiment, therefore, the user is made to recognize an object which is represented by an endmember spectrum judged to be a new endmember spectrum by the collation unit 107 and the user is made to determine whether to register the endmember spectrum.

Figure 4:
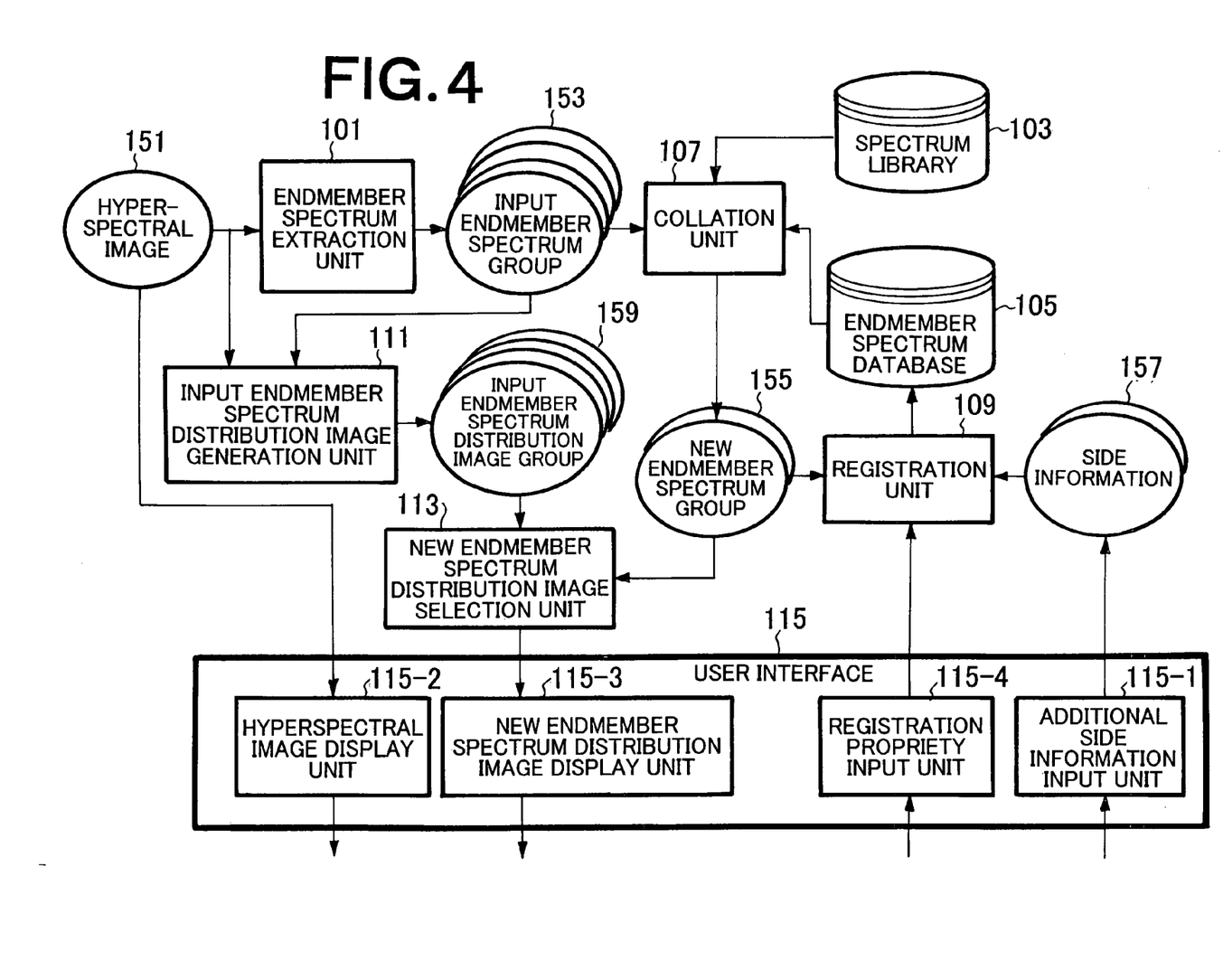
FIG. 4 is a block diagram showing a configuration of an endmember spectrum database construction apparatus according to a second embodiment of the present invention.

FIG. 4 is a block diagram showing a configuration of an endmember spectrum database construction apparatus according to the second embodiment of the present invention.

With reference to FIG. 4, the endmember spectrum database construction apparatus according to the present embodiment includes an endmember spectrum extraction unit 101, a spectrum library 103, an endmember spectrum database 105, a collation unit 107, a registration unit 109, an input endmember spectrum distribution image generation unit 111, a new endmember spectrum distribution image selection unit 113, an additional side information input unit 115-1, a hyperspectral image display unit 115-2, a new endmember spectrum distribution image display unit 115-3 and a registration propriety input unit 115-4. Although the endmember spectrum extraction unit 101, the collation unit 107, the registration unit 109, the input endmember spectrum distribution image generation unit 111, the new endmember spectrum distribution image selection unit 113, the additional side information input unit 115-1, the hyperspectral image display unit 115-2, the new endmember spectrum distribution image display unit 115-3 and the registration propriety input unit 115-4 can be formed of hardware, they can also be implemented by a computer which reads a computer-readable medium a program for causing the computer to function as these components and executes the program.

Since the endmember spectrum extraction unit 101, the spectrum library 103, the endmember spectrum database 105, the collation unit 107, the registration unit 109, and the additional side information input unit 115-1 are the same as those in the first embodiment, duplicate description is omitted.

The input endmember spectrum distribution image generation unit 111 generates an input endmember distribution image group 159 on the basis of a hyperspectral image 151 and an input endmember spectrum group 153. Each input endmember spectrum contained in the input endmember spectrum group 153 corresponds to each input endmember distribution image contained in the input endmember distribution image group 159. Each input endmember distribution image is generated on the basis of the hyperspectral image 151 and each input endmember spectrum by using the MF (Matched Filter) method, the linear unmixing method, or the like. In the MF method and the linear unmixing method, a spectrum of each pixel is considered to be a linear combination of the input endmember spectrum group, and a linear combination coefficient concerning each input endmember is used as the level of each input endmember spectrum. According to the MF method, a linear combination coefficient is found by regarding a spectrum at each pixel as a vector, projecting the vector on the input endmember spectrum vectors, and comparing magnitudes of the projected vectors. According to the linear unmixing method, linear combination coefficients are found by solving simultaneous equations. The MF method and the linear unmixing method are described in, for example, "Information extraction from earth observation data," Yoshio Yamaguchi, Kazuo Ouchi, et al., (foundation) Earth Remote Sensing Data Analysis Center (ERSDAC), 2003, pp. 118-122, and they are techniques for public use.

The new endmember spectrum distribution image selection unit 113 selects only an input endmember spectrum distribution image that is included in input endmember spectrum distribution images contained in the input endmember distribution image group 159 and that corresponds to new endmember spectrum contained in a new endmember spectrum group 155, as a new endmember distribution image, and outputs a mew endmember distribution image group to the new endmember distribution image display unit 115-3.

The hyperspectral image display unit 115-2 extracts spectra of three primary colors, i.e., red, green and blue from the hyperspectral image 151, and displays a color image formed of these spectra.

The new endmember distribution image display unit 115-3 displays a new endmember spectrum distribution image included in the new endmember distribution image group.

Whether each of new endmember spectra contained in the new endmember spectrum group 155 should be registered is input to the registration propriety input unit 115-4 by the user.

The registration unit 109 registers only a new endmember spectrum that is specified to be registered by the registration propriety input unit 115-4 among the new endmember spectra contained in the new endmember spectrum group 155, with the endmember spectrum database 105 together with side information 157.

Figure 5:
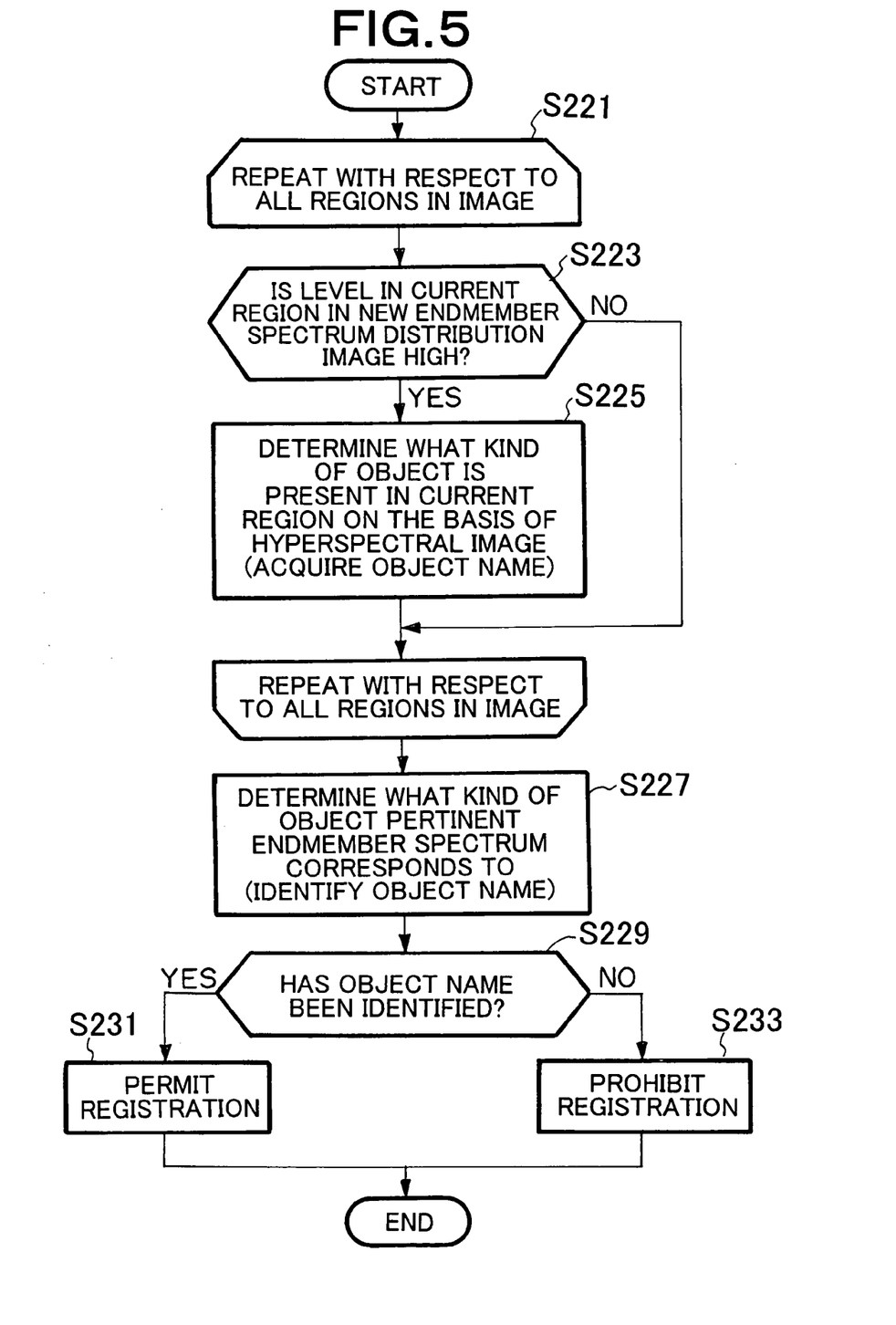
FIG. 5 is a flow chart showing a method according to the second embodiment of the present invention to be used by the user to determine whether new endmember spectra can be registered.

The method by which the user determines whether to register the new endmember spectrum on the basis of the hyperspectral image displayed by the hyperspectral image display unit 115-2 and the new endmember spectrum distribution image displayed by the new endmember spectrum distribution image display unit 115-3 will now be described with reference to FIG. 5.

First, steps S223 and S225 are repeated over all regions in an image (step S221).

At step S223, it is determined whether the level in a current region in the new endmember spectrum distribution image is high. If so (yes at the step S223), an object name is acquired by determining what kind of object is present in the current region on the basis of the hyperspectral image (step S225).

If the repetition at the step S221 is finished, one or more object names obtained by executing the step S225 once or more are judged synthetically. If possible, an object name corresponding to the new endmember spectrum is identified (step S227).

It is determined whether the object name has been identified (step S229). If the object name has been identified (yes at the step S229), registration is permitted (step S231). If the object name has not been identified (no at the step S229), registration is prohibited (step S233).

The additional side information input unit 115-1 inputs the object name which has been identified from the user.

Third Embodiment

The second embodiment is premised on the assumption that the resolution of the hyperspectral image is high enough for the user to identify the object name. However, the spatial resolution of the hyperspectral image in recent years is in the range of approximately 5 to 20 m, although it depends on the pickup height. Therefore, it is difficult for the user to identify the object name on the basis of the hyperspectral image in recent years. In the third embodiment, therefore, a high resolution image having a spatial resolution higher than that of the hyperspectral image is used.

Here, the relation between the hyperspectral image and the high resolution image will now be described.

In both a high resolution sensor and a hyperspectral sensor, an upper limit of sensitivity of a sensor element itself is substantially determined because of a technical limit. In order to certainly convert light which enters the sensor to a signal, it is necessary to strengthen the energy of light which strikes the element. The energy of light mainly depends on the view angle of light which is incident on the element and the breadth of wavelength of light obtained by the element. In order to strengthen the light energy, therefore, two ways, i.e., increasing the quantity of light striking the sensor element by widening the view angle of light striking the element (roughening the resolution), and widening the wavelength band of light obtained by the sensor element are conceivable. In the high resolution sensor, it is necessary to roughen the spectral resolution, because the view angle of the sensor is made very narrow in order to raise the resolution. On the other hand, in the hyperspectral sensor, it is necessary to widen the view angle because the wavelength band obtained by the sensor element is made narrow in order to raise the wavelength resolution. By these reasons, it is difficult to produce a hyperspectral sensor having a high resolution in recent years. In recent years, therefore, a hyperspectral image having a resolution equivalent to that of the high resolution image cannot be obtained.

Figure 6:
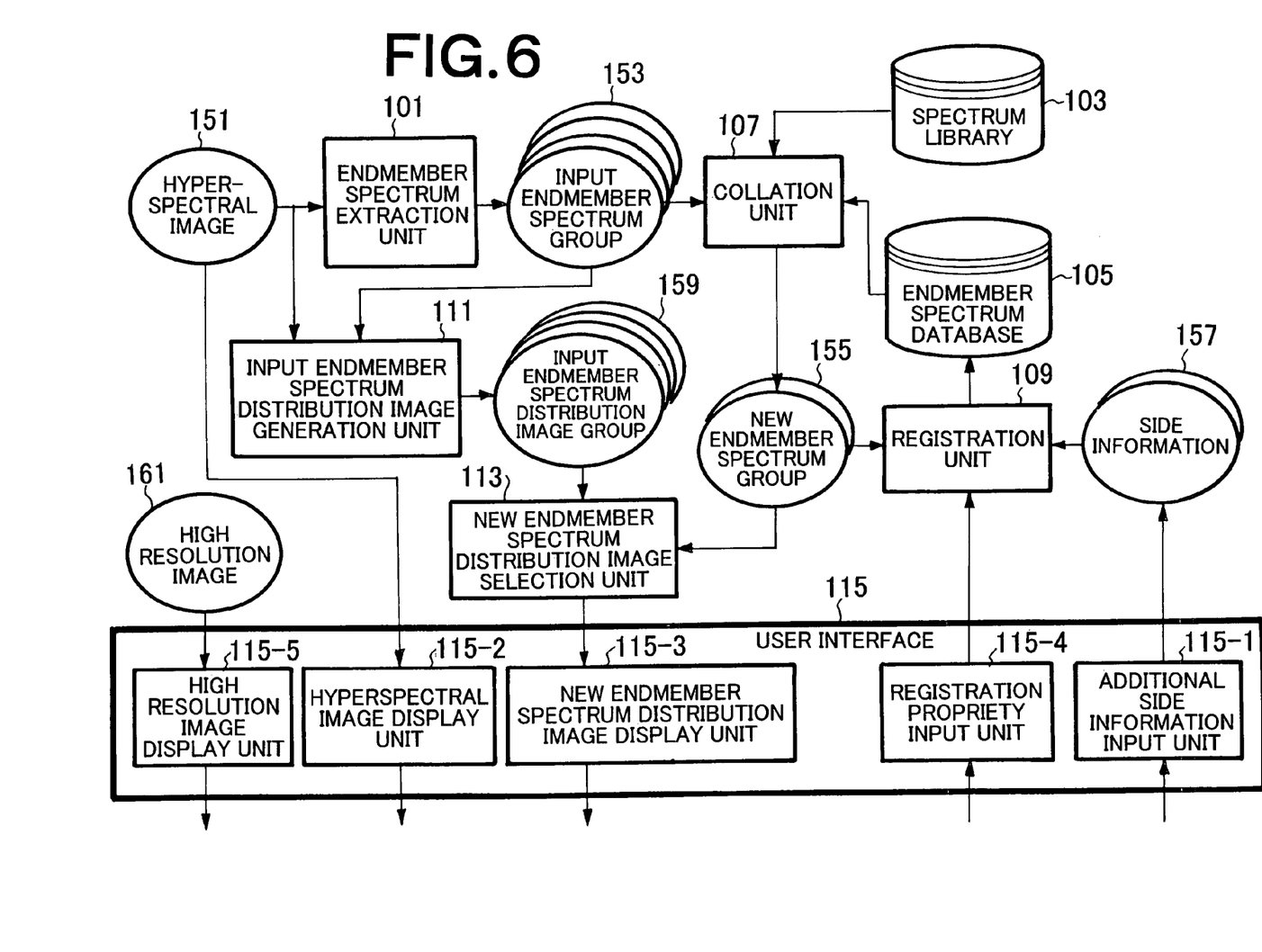
FIG. 6 is a block diagram showing a configuration of an endmember spectra database construction apparatus according to a third embodiment of the present invention.

FIG. 6 is a block diagram showing a configuration of an endmember spectrum database construction apparatus according to the third embodiment of the present invention.

With reference to FIG. 6, the endmember spectrum database construction apparatus according to the present embodiment includes an endmember spectrum extraction unit 101, a spectrum library 103, an endmember spectrum database 105, a collation unit 107, a registration unit 109, an input endmember spectrum distribution image generation unit 111, a new endmember spectrum distribution image selection unit 113, an additional side information input unit 115-1, a hyperspectral image display unit 115-2, a new endmember spectrum distribution image display unit 115-3, a registration propriety input unit 115-4, and a high resolution image display unit 115-5. Although the endmember spectrum extraction unit 101, the collation unit 107, the registration unit 109, the input endmember spectrum distribution image generation unit 111, the new endmember spectrum distribution image selection unit 113, the additional side information input unit 115-1, the hyperspectral image display unit 115-2, the new endmember spectrum distribution image display unit 115-3, the registration propriety input unit 115-4, and the high resolution image display unit 115-5 can be formed of hardware, they can also be implemented by a computer which reads a computer-readable medium a program for causing the computer to function as these components and executes the program.

Since components other than the high resolution image display unit 115-5 are the same as those in the second embodiment, duplicate description is be omitted.

The high resolution image display unit 115-5 displays a high resolution image 161.

Figure 7:
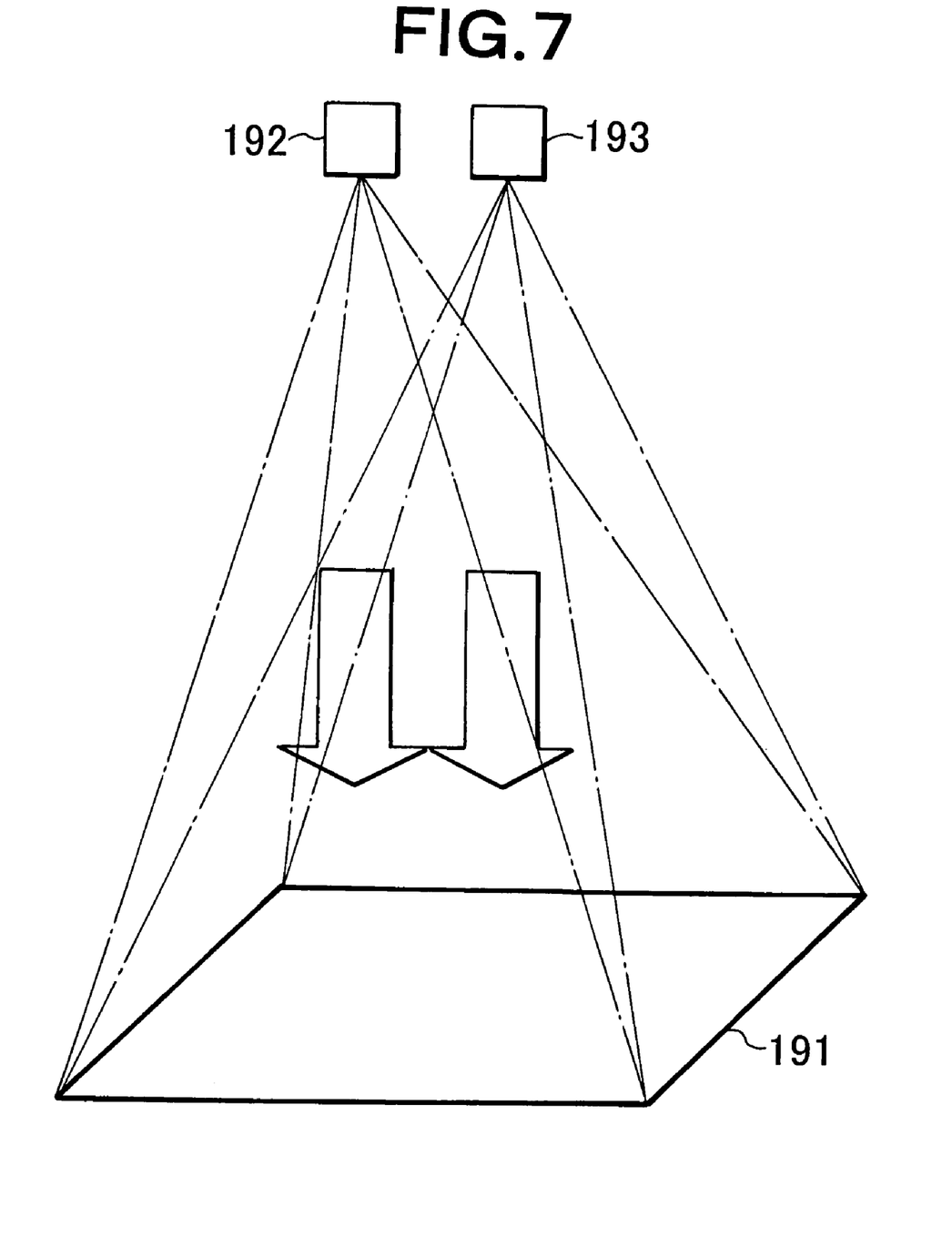
FIG. 7 is a diagram showing a pickup method for a hyperspectral image and a high resolution image according to the third embodiment of the present invention.

In the third embodiment, a hyperspectral image 151 and the high resolution image 161 have been obtained by picking up an image of a region 191 from the sky with a hyperspectral image camera 192 and a high resolution image camera 193 as shown in FIG. 7. The hyperspectral image camera 192 and the high resolution image camera 193 may be mounted on the same flying object, or may be mounted on separate flying objects. If only a still object is contained in the region 191, the hyperspectral image and the high resolution image may be picked up at different date and time. If, for example, a running vehicle is contained in the region 191, however, it is desirable to pick up the hyperspectral image and the high resolution image simultaneously or substantially simultaneously.

Figure 8:
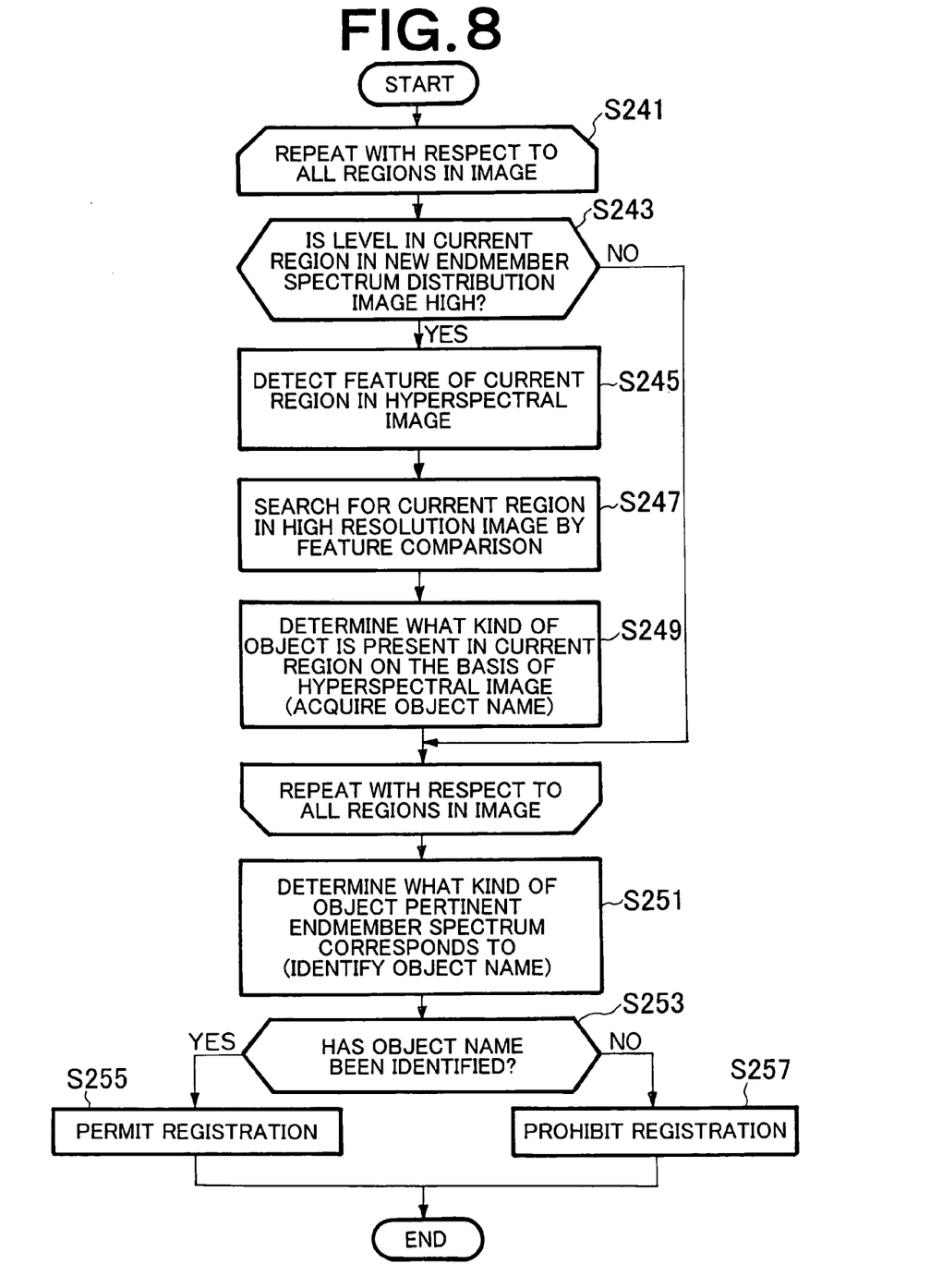
FIG. 8 is a flow chart showing a method according to the third embodiment of the present invention to be used by the user to determine whether new endmember spectra can be registered.

The method by which the user determines whether to register the new endmember spectrum on the basis of the hyperspectral image displayed by the hyperspectral image display unit 115-2 and the new endmember spectrum distribution image displayed by the new endmember spectrum distribution image display unit 115-3, and the high resolution image display unit 115-5 will now be described with reference to FIG. 8.

First, steps S243 to S249 are repeated over all regions in an image (step S241).

At step S243, it is determined whether the level in a current region in the new endmember spectrum distribution image is high. If so (yes at the step S243), a feature of the current region in the hyperspectral image is detected (step S245). Here, the feature is expected to be found in a corresponding region in the high resolution image. Subsequently, a current region in the high resolution image which corresponds to the current region in the new endmember spectrum distribution image is searched for by feature comparison between the new endmember spectrum distribution image and the high resolution image (step S247). Subsequently, an object name is acquired by determining what kind of object is present in the current region on the basis of the high resolution image (step S249).

If the repetition at the step S241 is finished, one ore more object names obtained by executing the step S249 once or more are judged synthetically. If possible, an object name corresponding to the new endmember spectrum is identified (step S251).

Subsequently, it is determined whether the object name has been identified (step S253). If the object name has been identified (yes at the step S253), registration is permitted (step S255). If the object name has not been identified (no at the step S253), registration is prohibited (step S257).

The additional side information input unit 115-1 inputs the object name which has been identified from the user.

It is difficult to know what kind of object corresponds to a high level portion of the new endmember spectrum distribution image by directly comparing the new endmember spectrum distribution image with the high resolution image. On the other hand, since the new endmember spectrum distribution image and the hyperspectral image have the same scope and the same resolution, position correspondence relations can be obtained between the new endmember spectrum distribution image and the hyperspectral image with pixel resolution. Furthermore, since a color image based on the hyperspectral image displayed by the hyperspectral image display unit 115-2 is visually similar to an ordinary color image, position correspondence relations can be obtained between the hyperspectral image and the high resolution image on the basis of the features of the images. Therefore, it becomes possible to know what kind of object corresponds to a high level portion of the new endmember spectrum distribution image on the basis of the new endmember spectrum distribution image and the high resolution image.

Figure 9:
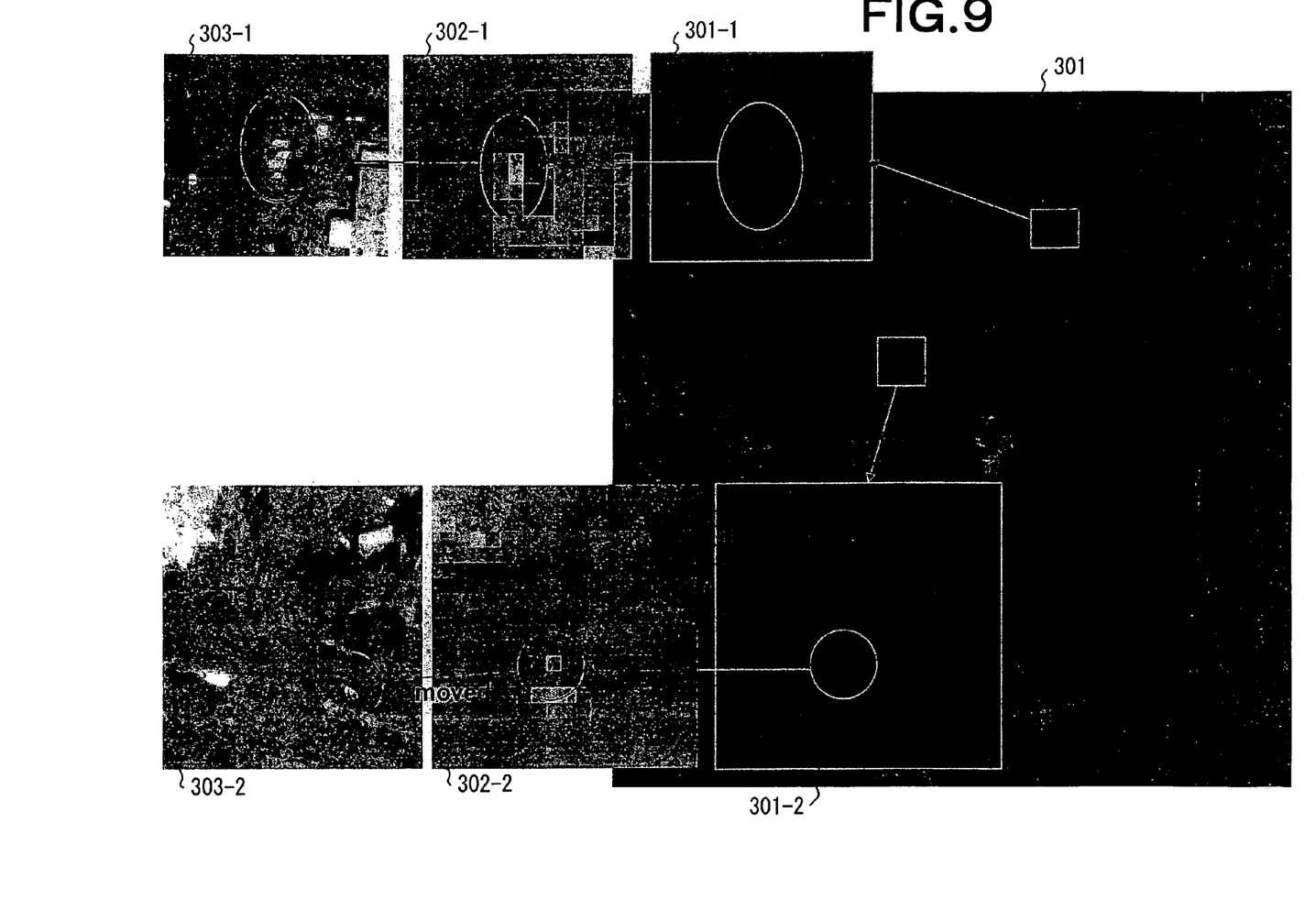
FIG. 9 is a diagram showing an object identifying method using a new endmember spectrum distribution image, a hyperspectral image and a high resolution image according to the third embodiment of the present invention.

FIG. 9 indicates that correspondence relations in position between the new endmember spectrum distribution image and the hyperspectral image can be found and correspondence relations in position between the hyperspectral image and the high resolution image can be found.

Reference numeral 301 denotes a new endmember spectrum distribution image. Reference numerals 301-1 and 301-2 denote enlarged views of portions in the new endmember spectrum distribution image 301. Reference numerals 302-1 and 302-2 denote hyperspectral images. Reference numerals 303-1 and 303-2 denote high resolution images. The portion of the new endmember spectrum distribution image indicated by the numeral 301-1 corresponds to the hyperspectral image 302-1 and the high resolution image 303-1. The portion of the new endmember spectrum distribution image indicated by the numeral 301-2 corresponds to the hyperspectral image 302-2 and the high resolution image 303-2.

In the portions 301-1 and 301-2 of the new endmember spectrum distribution image, there are high level pixels. In the hyperspectral images 302-1 and 302-2 having corresponding positions, objects contained in the high level pixels cannot be recognized. By examining the high resolution images 303-1 and 303-2 having corresponding positions, however, the objects can be identified as an automobile parked in a parking lot and an automobile running on a road.

The present invention can be used to construct an endmember database which stores endmember spectra of an object formed of a plurality of substances.

What is claimed is:

1. A computerized method for constructing an endmember spectrum database stored on a computer, wherein said database stores endmember spectra of objects each formed of a plurality of substances, said method comprising steps performed by the computer of:

obtaining a plurality of input endmember spectra from an input hyperspectral image;

calculating a similarity between each input endmember spectrum included in the input endmember spectra and a spectrum of each substance stored in a spectrum library which stores spectra respectively of substances;

calculating a similarity between each input endmember spectrum included in the input endmember spectra and each registered endmember spectrum already stored in the endmember spectrum database; and registering an input endmember spectrum that is included in the input endmember spectra and that is less than a predetermined value in all similarities, with the endmember spectrum database.

2. The method according to claim 1, wherein each of the similarities is a weighted average of similarities calculated by a plurality of similarity calculation methods.

3. The method according to claim 1, further comprising steps performed by the computer of:
receiving an object name corresponding to the input endmember spectrum registered, from outside; and
registering the object name with the endmember spectrum database so that the object name is associated with the input endmember spectrum registered.

4. The method according to claim 1, further comprising the step performed by the computer of:
receiving from outside whether to permit to register an input endmember spectrum that is included in the input endmember spectra and that is less than a predetermined value in all similarities, with the endmember spectrum database,
wherein at the registering step, an input endmember spectrum that is included in the input endmember spectra, that is less than a predetermined value in all similarities, and that is permitted to be registered, is registered with the endmember spectrum database.

5. The method according to claim 4, further comprising steps performed by the computer of:
generating a plurality of input endmember spectrum distribution images respectively corresponding to the plurality of the input endmember spectra, on the basis of the hyperspectral image and the plurality of input endmember spectra; and
displaying the hyperspectral image and the input endmember spectrum distribution image every input endmember spectrum.

6. The method according to claim 5, further comprising the step performed by the computer of displaying a high resolution image which has the same scope as the hyperspectral image and which is higher in resolution than the hyperspectral image.

7. The method according to claim 6, further comprising the step performed by the computer of obtaining the hyperspectral image and the high resolution image of the same subject at the same time by picking up images of the same subject simultaneously.

8. An apparatus for constructing an endmember spectrum database which stores endmember spectra of objects each formed of a plurality of substances, said apparatus comprising:
means for obtaining a plurality of input endmember spectra from an input hyperspectral image;
means for calculating a similarity between each input endmember spectrum included in the input endmember spectra and a spectrum of each substance stored in a spectrum library which stores spectra respectively of substances;
means for calculating a similarity between each input endmember spectrum included in the input endmember spectra and each registered endmember spectrum already stored in the endmember spectrum database; and
means for registering an input endmember spectrum that is included in the input endmember spectra and that is less than a predetermined value in all similarities, with the endmember spectrum database.

9. The apparatus according to claim 8, wherein each of the similarities is a weighted average of similarities calculated by a plurality of similarity calculation methods.

10. The apparatus according to claim 8, further comprising:
means for inputting an object name corresponding to the input endmember spectrum registered, from outside; and
means for registering the object name with the endmember spectrum database so that the object name is associated with the input endmember spectrum registered.

11. The apparatus according to claim 8, further comprising:
means for inputting from outside whether to permit to register an input endmember spectrum that is included in the input endmember spectra and that is less than a predetermined value in all similarities, with the endmember spectrum database,
wherein the means for register registers an input endmember spectrum that is included in the input endmember spectra, that is less than a predetermined value in all similarities, and that is permitted to be registered, with the endmember spectrum database.

12. The apparatus according to claim 11, further comprising:
means for generating a plurality of input endmember spectrum distribution images respectively corresponding to the plurality of the input endmember spectra, on the basis of the hyperspectral image and the plurality of input endmember spectra; and
means for displaying the hyperspectral image and the input endmember spectrum distribution image every input endmember spectrum.

13. The apparatus according to claim 12, further comprising means for displaying a high resolution image which has the same scope as the hyperspectral image and which is higher in resolution than the hyperspectral image.

14. The apparatus according to claim 13, further comprising means for obtaining the hyperspectral image and the high resolution image of the same subject at the same time by picking up images of the same subject simultaneously.

15. A program product embodied on a computer-readable medium and comprising codes that, when executed, cause a computer to perform a method for constructing an endmember spectrum database which stores endmember spectra of objects each formed of a plurality of substances, said method comprising the steps of:
obtaining a plurality of input endmember spectra from an input hyperspectral image;
calculating a similarity between each input endmember spectrum included in the input endmember spectra and a spectrum of each substance stored in a spectrum library which stores spectra respectively of substances;
calculating a similarity between each input endmember spectrum included in the input endmember spectra and each registered endmember spectrum already stored in the endmember spectrum database; and
registering an input endmember spectrum that is included in the input endmember spectra and that is less than a predetermined value in all similarities, with the endmember spectrum database.

16. The program product according to claim 15, wherein each of the similarities is a weighted average of similarities calculated by a plurality of similarity calculation methods.

17. The program product according to claim 15, wherein said method further comprises the steps of:
inputting an object name corresponding to the input endmember spectrum registered, from outside; and
registering the object name with the endmember spectrum database so that the object name is associated with the input endmember spectrum registered.

18. The program product according to claim 15, wherein said method further comprises the step of:

inputting from outside whether to permit to register an input endmember spectrum that is included in the input endmember spectra and that is less than a predetermined value in all similarities, with the endmember spectrum database, wherein at the registering step, an input endmember spectrum that is included in the input endmember spectra, that is less than a predetermined value in all similarities, and that is permitted to be registered, is registered with the endmember spectrum database.

19. The program product according to claim 18, wherein said method further comprises the steps of:

generating a plurality of input endmember spectrum distribution images respectively corresponding to the plurality of the input endmember spectra, on the basis of the hyperspectral image and the plurality of input endmember spectra; and displaying the hyperspectral image and the input endmember spectrum distribution image every input endmember spectrum.

20. The program product according to claim 19, wherein said method further comprises the step of displaying a high resolution image which has the same scope as the hyperspectral image and which is higher in resolution than the hyperspectral image.

21. The program product according to claim 20, wherein said method further comprises the step of obtaining the hyperspectral image and the high resolution image of the same subject at the same time by picking up images of the same subject simultaneously.

* * * * *

UNITED STATES PATENT AND TRADEMARK OFFICE
CERTIFICATE OF CORRECTION

PATENT NO.      : 7,630,990 B2
APPLICATION NO. : 11/168338
DATED           : December 8, 2009
INVENTOR(S)     : Hiromichi Hirata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Second Day of November, 2010

David J. Kappos
*Director of the United States Patent and Trademark Office*